(12) United States Patent
Mróz et al.

(10) Patent No.: US 12,676,935 B2
(45) Date of Patent: Jul. 7, 2026

---

(54) SYSTEMS AND METHODS FOR SEAMLESS TELECONFERENCING

(71) Applicant: Cisco Technology, Inc., San Jose, CA (US)

(72) Inventors: Błażej Mróz, Warsaw (PL); Dror E. Maydan, Palo Alto, CA (US); Piotr B. Rozen, Gdansk (PL); Mihailo Kolundzija, Lausanne (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 293 days.

(21) Appl. No.: 18/456,630

(22) Filed: Aug. 28, 2023

(65) Prior Publication Data

US 2025/0080656 A1     Mar. 6, 2025

(51) Int. Cl.
| | |
|---|---|
| *H04M 3/56* | (2006.01) |
| *H04R 1/40* | (2006.01) |
| *H04R 3/00* | (2006.01) |
| *H04R 29/00* | (2006.01) |

(52) U.S. Cl.
CPC .............. *H04M 3/56* (2013.01); *H04R 1/406* (2013.01); *H04R 3/005* (2013.01); *H04R 29/005* (2013.01)

(58) Field of Classification Search
CPC ........ H04M 3/568; H04M 3/002; H04M 3/56; H04M 9/08; H04M 2203/2094; H04M 2203/50; H04M 3/569; H04N 7/147; H04N 7/15; H04R 1/08; H04R 29/004
USPC ........................................................ 455/416
See application file for complete search history.

(56) References Cited

U.S. PATENT DOCUMENTS

| | | | |
|---|---|---|---|
| 10,089,998 B1 * | 10/2018 | Srinivas .............. | G10L 21/0208 |
| 10,764,442 B1 | 9/2020 | Delaney et al. | |
| 10,820,120 B2 * | 10/2020 | Leppanen .............. | H04R 3/005 |
| 11,502,860 B2 | 11/2022 | Casas et al. | |

(Continued)

FOREIGN PATENT DOCUMENTS

CN         107547704 A      1/2018

OTHER PUBLICATIONS

Around Miro Lab, "Video Calls Loved by Extraordinary Teams," https://www.around.co/, Retrieved on Aug. 10, 2023, 8 Pages.

(Continued)

*Primary Examiner* — Maria El-Zoobi
(74) *Attorney, Agent, or Firm* — Edell, Shapiro & Finnan, LLC

(57)     ABSTRACT

Presented herein are techniques for seamless teleconferencing. A method can include selecting a first microphone for an audio call, the first microphone associated with a first device of multiple devices that are in proximity to one another and are each connected to the audio call. The method can further include selecting a first speaker for the audio call, the first speaker associated with one of the multiple devices. The method can further include inhibiting audio associated with all microphones and speakers associated with the multiple devices except for the first microphone and the first speaker. The method can further include switching to a second microphone associated with a second device of the multiple devices after a period of time by aligning audio streams of the first microphone and of the second microphone, inhibiting audio associated with the first microphone after the aligning, and enabling audio associated with the second microphone.

25 Claims, 8 Drawing Sheets

(56) References Cited

U.S. PATENT DOCUMENTS

| | | | |
|---|---|---|---|
| RE49,462 E | 3/2023 | Burenius et al. | |
| 2016/0227336 A1 | 8/2016 | Sakri et al. | |
| 2017/0346950 A1 | 11/2017 | Shaltiel et al. | |
| 2020/0099792 A1* | 3/2020 | Nguyen | H04W 4/08 |
| 2020/0329323 A1* | 10/2020 | Clark | H04N 7/147 |
| 2020/0351265 A1* | 11/2020 | Srinath | H04N 7/152 |
| 2021/0345040 A1* | 11/2021 | Meyer | H04R 3/005 |
| 2023/0421702 A1* | 12/2023 | Cutler | H04M 3/568 |

OTHER PUBLICATIONS

International Search Report and Written Opinion for counterpart International Application No. PCT/US2024/043132, mailed Nov. 15, 2024, 12 pages.

* cited by examiner

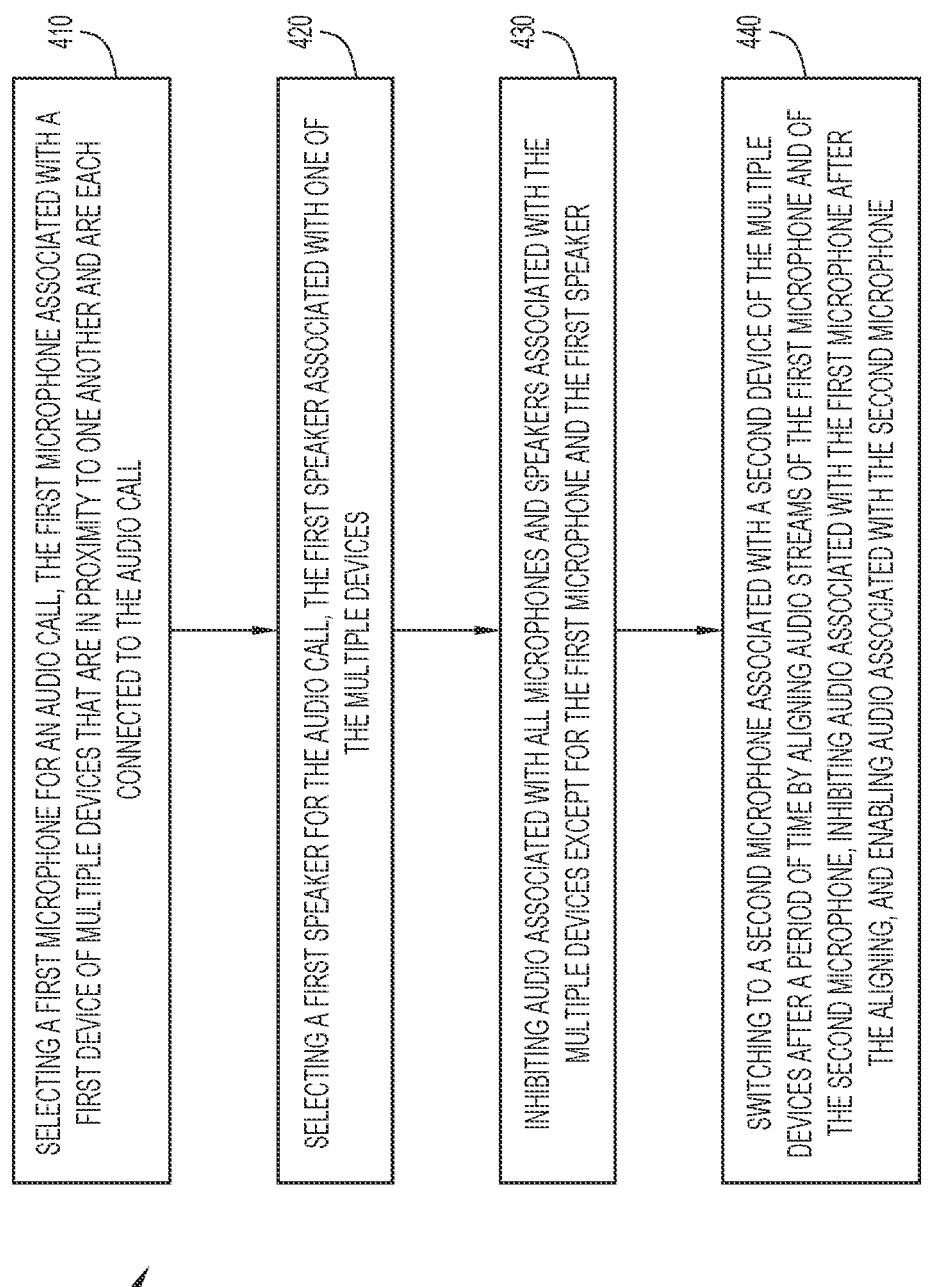

400

410
SELECTING A FIRST MICROPHONE FOR AN AUDIO CALL, THE FIRST MICROPHONE ASSOCIATED WITH A FIRST DEVICE OF MULTIPLE DEVICES THAT ARE IN PROXIMITY TO ONE ANOTHER AND ARE EACH CONNECTED TO THE AUDIO CALL

420
SELECTING A FIRST SPEAKER FOR THE AUDIO CALL, THE FIRST SPEAKER ASSOCIATED WITH ONE OF THE MULTIPLE DEVICES

430
INHIBITING AUDIO ASSOCIATED WITH ALL MICROPHONES AND SPEAKERS ASSOCIATED WITH THE MULTIPLE DEVICES EXCEPT FOR THE FIRST MICROPHONE AND THE FIRST SPEAKER

440
SWITCHING TO A SECOND MICROPHONE ASSOCIATED WITH A SECOND DEVICE OF THE MULTIPLE DEVICES AFTER A PERIOD OF TIME BY ALIGNING AUDIO STREAMS OF THE FIRST MICROPHONE AND OF THE SECOND MICROPHONE, INHIBITING AUDIO ASSOCIATED WITH THE FIRST MICROPHONE AFTER THE ALIGNING, AND ENABLING AUDIO ASSOCIATED WITH THE SECOND MICROPHONE

FIG.4

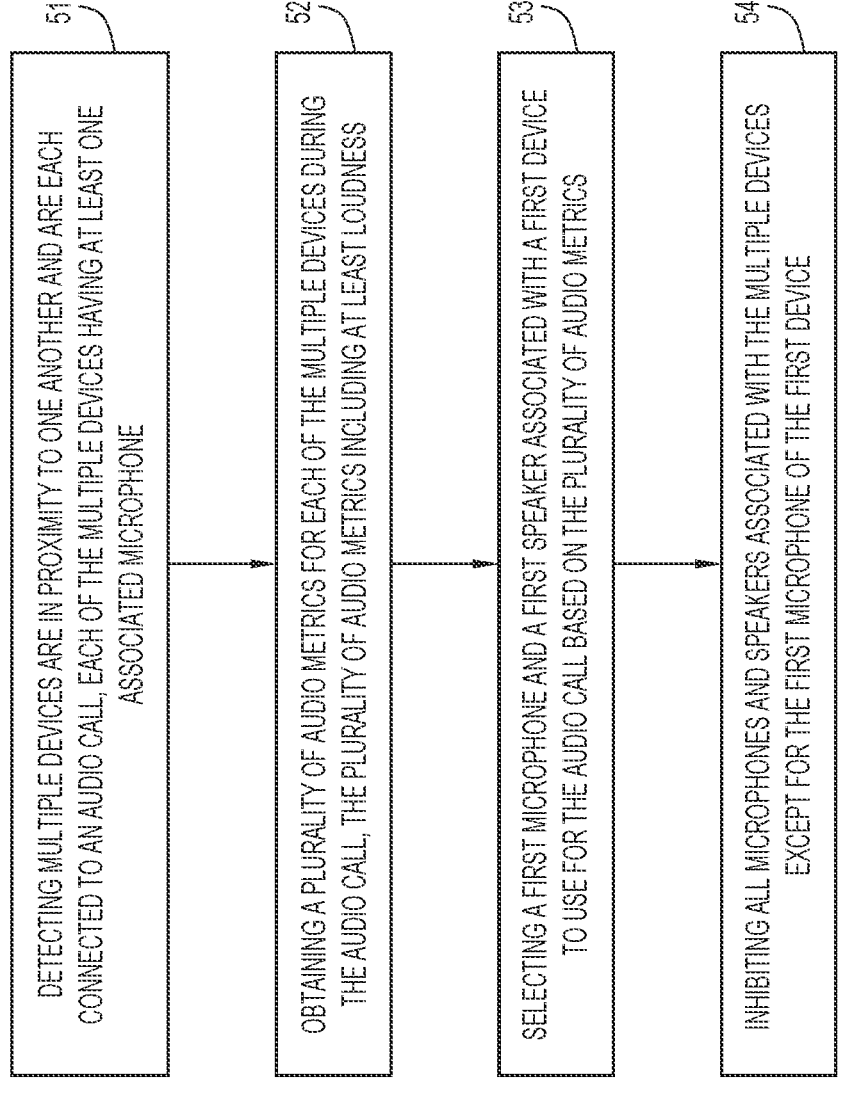

DETECTING MULTIPLE DEVICES ARE IN PROXIMITY TO ONE ANOTHER AND ARE EACH CONNECTED TO AN AUDIO CALL, EACH OF THE MULTIPLE DEVICES HAVING AT LEAST ONE ASSOCIATED MICROPHONE

510

OBTAINING A PLURALITY OF AUDIO METRICS FOR EACH OF THE MULTIPLE DEVICES DURING THE AUDIO CALL, THE PLURALITY OF AUDIO METRICS INCLUDING AT LEAST LOUDNESS

520

SELECTING A FIRST MICROPHONE AND A FIRST SPEAKER ASSOCIATED WITH A FIRST DEVICE TO USE FOR THE AUDIO CALL BASED ON THE PLURALITY OF AUDIO METRICS

530

INHIBITING ALL MICROPHONES AND SPEAKERS ASSOCIATED WITH THE MULTIPLE DEVICES EXCEPT FOR THE FIRST MICROPHONE OF THE FIRST DEVICE

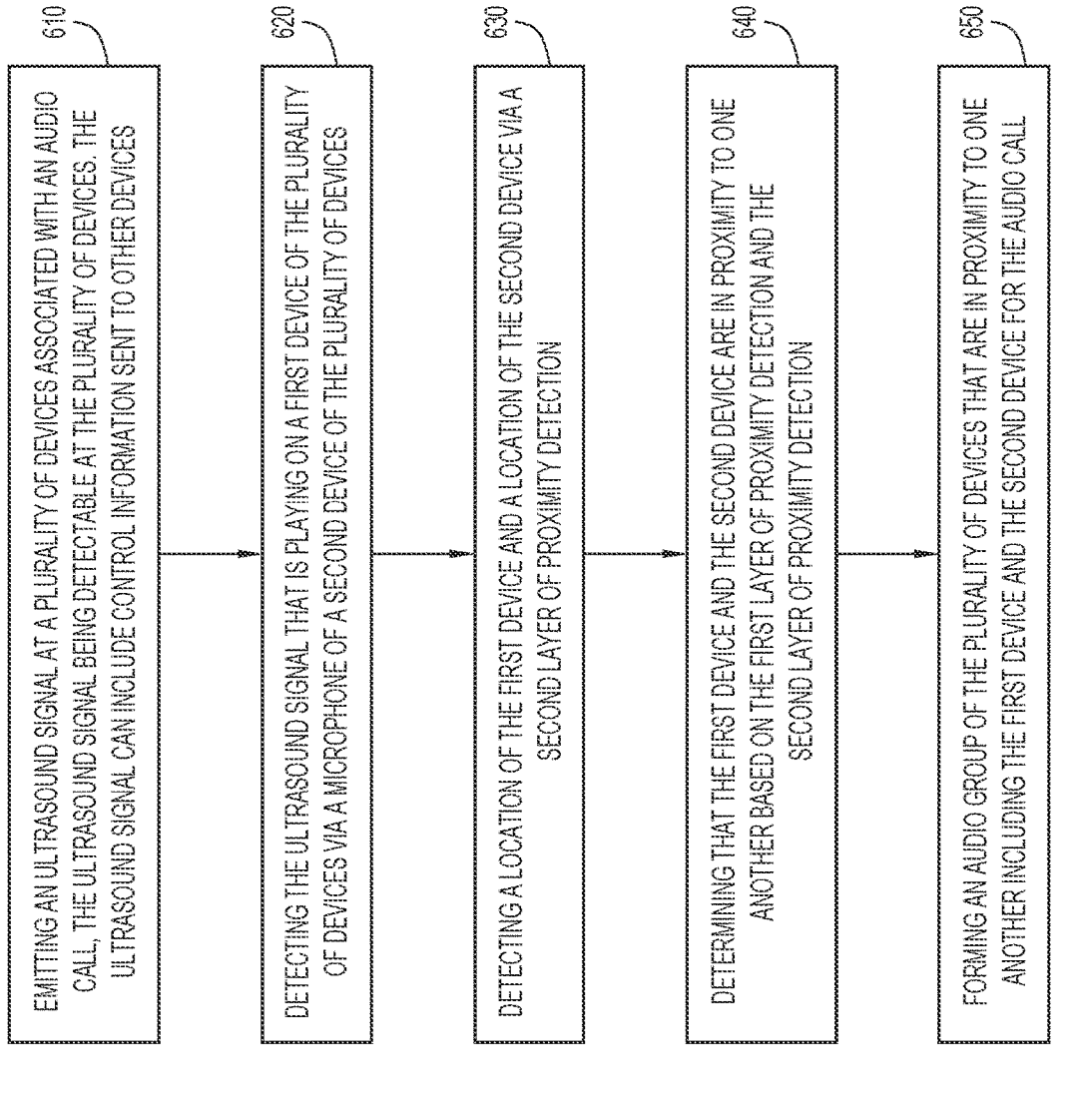

610

EMITTING AN ULTRASOUND SIGNAL AT A PLURALITY OF DEVICES ASSOCIATED WITH AN AUDIO CALL, THE ULTRASOUND SIGNAL BEING DETECTABLE AT THE PLURALITY OF DEVICES, THE ULTRASOUND SIGNAL CAN INCLUDE CONTROL INFORMATION SENT TO OTHER DEVICES

620

DETECTING THE ULTRASOUND SIGNAL THAT IS PLAYING ON A FIRST DEVICE OF THE PLURALITY OF DEVICES VIA A MICROPHONE OF A SECOND DEVICE OF THE PLURALITY OF DEVICES

630

DETECTING A LOCATION OF THE FIRST DEVICE AND A LOCATION OF THE SECOND DEVICE VIA A SECOND LAYER OF PROXIMITY DETECTION

640

DETERMINING THAT THE FIRST DEVICE AND THE SECOND DEVICE ARE IN PROXIMITY TO ONE ANOTHER BASED ON THE FIRST LAYER OF PROXIMITY DETECTION AND THE SECOND LAYER OF PROXIMITY DETECTION

650

FORMING AN AUDIO GROUP OF THE PLURALITY OF DEVICES THAT ARE IN PROXIMITY TO ONE ANOTHER INCLUDING THE FIRST DEVICE AND THE SECOND DEVICE FOR THE AUDIO CALL

SYSTEMS AND METHODS FOR SEAMLESS TELECONFERENCING

TECHNICAL FIELD

The present disclosure relates to systems and methods for seamless teleconferencing with multiple co-located devices.

BACKGROUND

Conference calls enable participants or users of two or more computing devices to speak with each other from multiple locations. The conference call could have accompanied video as is common in a video conference session. The locations of the participants may be physically remote from one another. When there are two or more user devices associated with participants in a conference room location that is participating in a conference call, the merging of the audio streams for the conference call can create a potentially unstable audio feedback loop creating echo, which is distracting and undesirable to participants on the conference call. Additionally, if there is only one device in a conference room, people speaking far from the microphone(s) of that device may not be well heard.

BRIEF DESCRIPTION OF THE DRAWINGS

FIGS. 4-6 are flow charts depicting operations employed as part of the overall method for preventing echo in a conference call, according to an example embodiment.

DESCRIPTION OF EXAMPLE EMBODIMENTS

Overview

Figure 1A:
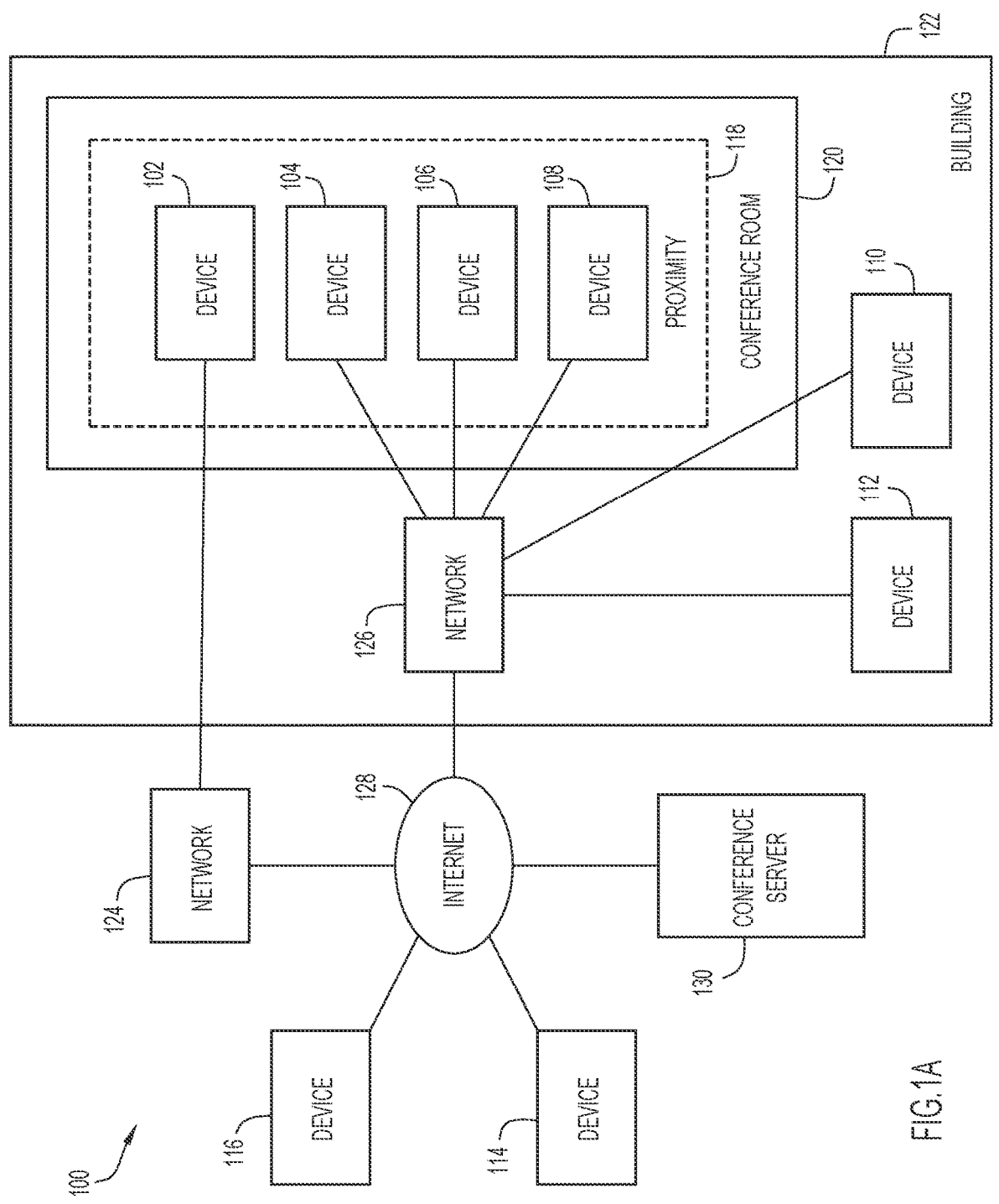
FIG. 1A is a block diagram of an example system for preventing echo in a conference call, according to an example embodiment.

Presented herein are techniques for seamless teleconferencing including preventing an echo in a conference call while enabling participants to be heard from the microphone of a nearby device. According to one aspect a method involves selecting a first microphone for an audio call, the first microphone associated with a first device of multiple devices that are in proximity to one another and are each connected to the audio call. The method further involves selecting a first speaker for the audio call, the first speaker associated with one of the multiple devices. The method further involves inhibiting audio associated with all microphones and speakers associated with the multiple devices except for the first microphone and the first speaker. The method further involves switching to a second microphone associated with a second device of the multiple devices after a period of time by aligning audio streams of the first microphone and of the second microphone inhibiting audio associated with the first microphone after the aligning, and enabling audio associated with the second microphone. It should be appreciated that each device can have an array of microphones that can be combined through beamforming and other methods into an audio stream; the term microphone is used to refer to both a device microphone or an audio stream formed by combining signals from an array of device microphones.

According to another aspect, a method involves detecting multiple devices are in proximity to one another and are each connected to an audio call, each of the multiple devices having at least one associated microphone. The method further involves obtaining one or more audio metrics for each of the multiple devices during the audio call. The one or more audio metrics may include at least loudness. The method further involves selecting a first microphone associated with a first device to use for the audio call based on the plurality of audio metrics. The method further involves inhibiting all microphones associated with the multiple devices except for the first microphone of the first device.

According to another aspect, a method involves emitting an ultrasound signal at a plurality of devices associated with an audio call, the ultrasound signal being detectable at the plurality of devices. The ultrasound signal can include control information sent to other devices. The method further involves detecting the ultrasound signal that is playing on a first device of the plurality of devices via a microphone of a second device of the plurality of devices. The method further involves detecting a location of the first device and a location of the second device via wireless local area network proximity detection. The method further involves determining that the first device and the second device are in proximity to one another based on detecting the ultrasound emission and/or the wireless local area network proximity detection. In other words, two devices may be determined to be in proximity to each other based on user-assisted wireless-only (wireless local area proximity detection) or a fusion of ultrasound detection and wireless local area network proximity detection. The method further involves forming an audio group of the plurality of devices that are in proximity to one another including the first device and the second device for the audio call.

EXAMPLE EMBODIMENTS

In dynamic/hybrid work environments, people work from offices and from home or less formal spaces like cafeterias or leased collaboration spaces, where there is no specialized equipment. Multiple users may participate in a conference call where some of the participants are located in the same room (e.g., a conference room or space where the participants are in proximity to one another) and other participants are at physically remote locations (homes, etc.). In a less formal work environment, the environment itself may not provide a user with devices or software for performing and managing a conference call with multiple users. For example, a formal office space may provide shared microphones or multiple satellite microphones, screens, speaker phone devices, etc. (e.g., around a conference table or at multiple locations in a conference room) that participants in the room can share or use and may employ specialized audio-video equipment and software to enable all to be heard while preventing howling and echo.

Multiple users that are in proximity to one another may each use a different device with a microphone and speaker (loudspeaker) for purposes of participating in a conference call. The use of multiple devices, each with their own microphone(s) and speaker(s), in proximity to one another for a conference call can lead to positive feedback loops which may be heard by other participants as a howling effect or an audio echo. The positive feedback loops can also occur during an ongoing conference call when a participant moves locations within a conference room or space to be in proximity to another participant of the conference call.

To avoid howling or acoustic echo, multiple participants that are in proximity might share a single device. Participants that are further from the microphone or microphones of the device might not be heard at sufficient volume.

One solution can be to inhibit audio from all but one selected microphone and speaker (e.g. loudspeaker) for devices in proximity to one another. Inhibiting audio of a given device of the multiple devices can mean not sending, not forwarding, or not playing back an associated audio stream. Inhibiting audio can also refer to muting a detected/ received audio stream, attenuating an audio stream, or dropping an audio stream. The one microphone and loudspeaker may be selected randomly and/or the selection may take place manually where each participant, except one, manually inhibits an associated microphone and speaker. This solution, however, can create another problem: participants may sit far from the selected microphone and therefore be inaudible for remote participants on the conference call. Techniques presented herein address both issues at the same time, by preventing echo/howling and providing better audio quality from huddle spaces or conference rooms compared to a "just mute" solution described above.

The techniques presented herein can include dual-stage proximity detection that helps pair/un-pair a device when a participant walks in/out of proximity of devices of other participants during the conference call. The dual-stage proximity can include ultrasound energy tracking and proximity token detection, possibly in conjunction with wireless local area proximity detection as a backup for cases where ultrasound is not supported or fails.

The present technology can be used when the devices of the participants connect from the same location or proximity (e.g., same conference room or space) but wirelessly connect to different access points and thus experience non-uniform networking delays such as may occur for connections to a Wi-Fi® wireless local area network, a virtual private network (VPN), cellular network, or a fixed link. The present technology can work when an audio (audio/video) stream has been discontinued. For example, a conference server can save link bandwidth and can stop broadcasting data from a set of sources for periods of silence.

The techniques presented herein can select a first microphone from among a plurality of microphones that are in proximity to one another, and subsequently select and switch to a second microphone during the conference call. The techniques can align the audio stream of the first microphone with the audio stream of the second microphone before the switch occurs. Alignment of audio streams can be used instead of selecting one stream or mixing/beamforming streams. Aligning streams can be more resource-effective and provides quality comparable to other available solutions. Aligning streams can include low resource dual-stage stream alignment, which can provide a tunable user experience.

A conference call can be a multi-party call that is a communication session between two or more participants for a period of time. Each participant may have a user device. More than one participant may be associated with or use the same device (e.g., a conference endpoint) during the conference call. The conference call has an audio component and may or may not include an associated video component, such as is the case when the conference call is a video conference call/session. A conference call can also be referred to as a conference session or meeting.

FIG. 1A shows an example system 100 that includes devices 102, 104, 106, 108, 110, 112, 114, and 116 that participate with one another on a conference call. The system 100 can also include a conference room 120 that is in a building 122, a network 124, a network 126, the Internet 128, and a conference server 130. The devices 102, 104, 106, and 108 of the system 100 can be in proximity 118 to one another. For example, the devices 102, 104, 106, and 108 can be in a conference room 120 (or other physical space) in relatively close proximity with one another, e.g., with 1-3 meters between adjacent devices. The conference room 120 can be located in a building 122. Other devices, such as devices 110 and 112 can also be located in the building 122 but not in the conference room 120, and thus not in proximity to other devices that are participating in the conference call. The device 102 can be connected to network 124. The network 124 can be a network such as a cellular network that may use any wireless wide area network communication technology now known or hereinafter developed, such as third generation 3G, 4G, 5G, Long Term Evolution (LTE), etc. The network 124 can be connected to the Internet 128. The devices 104, 106, and 108 can be connected to the network 126 that can be associated with the building 122. The network 126 can be a wireless network such as a radio network, a Wi-Fi wireless local area network, etc., and can also include a local area network that employs hard wire connections such as Ethernet. The devices 110 and 112 may not be in proximity 118 to other devices but can be connected to the network 126 associated with the building 122. The network 126 can connect to the Internet 128. The device 114 and the device 116 can be located physically remote from the building 122 and can be connected to the Internet 128 through various network connections mentioned above. For example, the devices 114 and 116 may be in other buildings of a campus or at homes of the associated users.

Therefore, devices 102, 104, 106, 108, 110, 112, 114, and 116 can be connected to one another via the Internet 128 but may access the Internet 128 through different networks, such as the network 124 and the network 126. The device 102 can be in proximity to the devices 104, 106, and 108 but can access the Internet 128 via the network 124 which is a different network that is used by the devices 104, 106, and 108. Thus, two devices may be in physical proximity to one another but can use different networks to access the Internet 128.

The building 122 with the conference room 120 can be any type of room or space including, but not limited to a formal workspace environment such as a dedicated conference room, or an informal workspace environment that can include a cafeteria, a restaurant, a leased space, a huddle space, a house, a library, etc.

The conference server 130 can be a computer system that is connected to the Internet 128 and can be used to manage or control the conference call between the devices. The conference server 130 can also be referred to as a conference bridge server. The conference server 130 is depicted as being outside of the building 122 but can also be located in the building 122, in another building on the campus of a business or enterprise, or at any datacenter location. More than one conference server may be involved to support one or more conference calls. In one example, the devices 102, 104, 106, 108, 110, 112, 114, and 116 can each determine proximity to other devices using techniques such as ultrasound proximity detection described herein. Proximity detection can be communicated by each of the devices to the conference server 130. In an alternative example, conference server 130 can perform the techniques presented herein, including performing tasks such as detecting when devices are in proximity to one another, selecting a microphone among a plurality of microphones in proximity to one another, selecting a second microphone to which to hand off, and aligning audio streams associated with microphones before a handoff. In one example, the devices work in conjunction with the conference server 130 to determine proximity to other devices. For example, the devices can perform ultrasound proximity detection or can detect wireless signals and the devices inform the conference server as to which wireless signals they detect, and the conference server 130 ultimately determines proximity based on the information it learns from the devices.

Figure 1B:
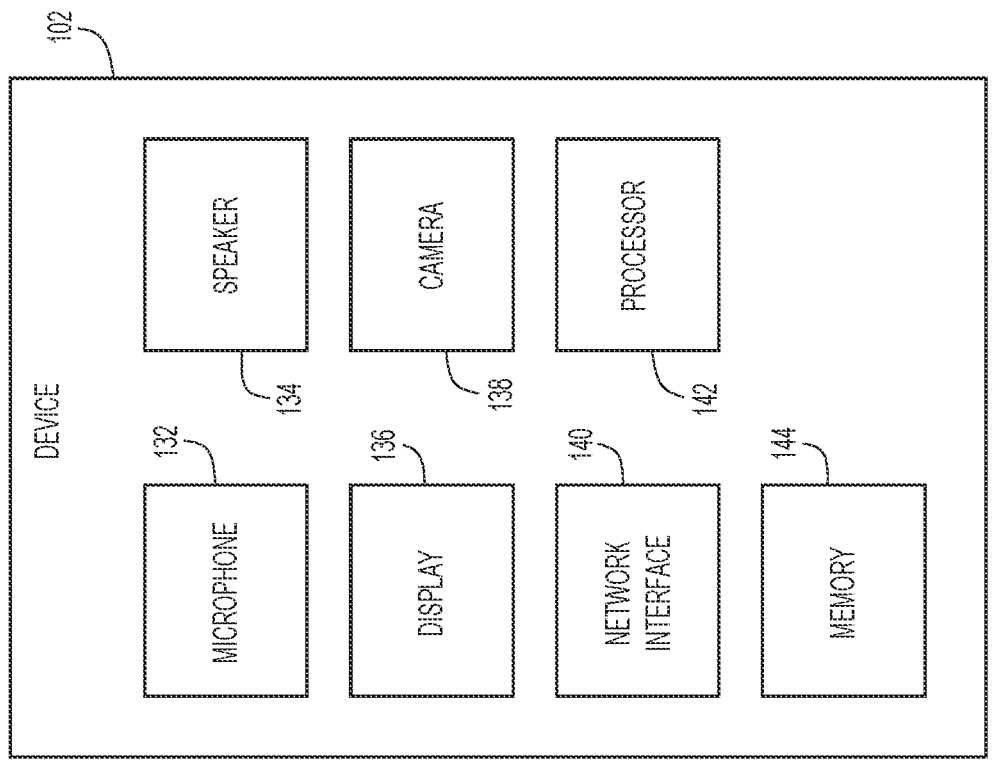
FIG. 1B is a block diagram of an example user device that may be connected to a conference call, according to an example embodiment.

FIG. 1B depicts an example block diagram of a user device that may participate in conference call, e.g., the device 102 of FIG. 1A. The components and capabilities of the device 102 described in FIG. 1B can also be applied to any of the devices 104, 106, 108, 110, 112, 114, and 116. The device 102 can include (or not include) a microphone 132, a speaker 134, a display 136, a camera 138, a network interface 140, a processor 142, and a memory 144. The device 102 can be a Smartphone, a laptop computer, a tablet computer, a desktop computer, a smart television, a smart speaker, or other electronic device with at least audio communication and network communication capabilities. The microphone 132 can include one or more microphones associated with the device 102 that can be used to electronically detect audio (including a human voice and other sounds) for purposes of the conference call. If the device 102 includes multiple microphones, audio signals from the multiple microphones may be combined into one using beam forming. The microphone 132 can also be used to detect ultrasound emissions that may be emitted by other devices associated with the conference call. The speaker 134 can include one or more speakers to emit audio sound waves associated with the conference call. The speaker 134 can be referred to as a loudspeaker. The speaker 134 can also be capable of emitting ultrasound. If appropriate, the device 102 may include a separate microphone for ultrasound detection and a separate speaker for ultrasound emission/playout.

The display 136 can be one or more electronic displays that are capable of displaying information. The display 136 can display text, images and video associated with the conference call. The display 136 can be a touchscreen and can be capable of serving a graphical user interface (GUI). The camera 138 can refer to one or more cameras associated with the device 102 that are capable of capturing video and images for the conference call. The network interface 140 can be a (wired and/or wireless) network interface card capable of communicating with other devices over a network such as the network 124, the network 126, and the Internet 128. The processor 142 and the memory 144 can be processors and memory associated with computing devices. It should be appreciated that each of the microphone 132, the speaker 134, the display 136, and the camera 138 may be integrated into a housing with the device 102 or may be external to the device 102 and connected by wire or wirelessly to the device 102.

With reference to FIGS. 1A and 1B, the system 100 and the device 102 may be used to implement the techniques of the present technology. For example, before and during a conference call, the present techniques can determine if two or more devices are in proximity to one another. Ultrasound emissions and detections can be employed to determine if two devices are in proximity to one another. For example, each of the devices 102, 104, 106, 108, 110, 112, 114, and 116 can emit an ultrasound signal. The device 104 can detect the ultrasound signal from the device 102 and communicate the detection to other devices as well as the conference server 130. Each of the devices 102, 104, 106, 108, 110, 112, 114, and 116 and/or the conference server 130 can then determine that devices that are in proximity to one another. If the device 102 emits the ultrasound signal and the device 104 does not detect the ultrasound signal then a determination can be made that the device 102 and the device 104 are not in proximity to one another. Using ultrasound may indicate that two devices are in proximity, but generally ultrasound cannot indicate that two devices are not in proximity because it is possible that ultrasound signals are not detected, and that may be the trigger to use wireless local area network proximity detection.

If two devices are not determined to be in proximity to one another via ultrasound proximity detection, then wireless proximity detection techniques may be employed to test whether or not the devices are in proximity to one another.

The ultrasound emission may not be audible to the human ear but can be detected by another device. Ultrasound emissions can also be reflected off and absorbed by walls which prevents proximity detection of a device that is not in the same room as the device emitting the ultrasound. For example, the ultrasound emissions or signals can be at 18-19 khz. Ultrasound emissions and detections can be employed to initially determine if devices are in proximity to one another and can be used throughout the conference call to determine if the devices are still in proximity to one another or if a new device has entered into proximity. The ultrasound emissions and detections may employ Ramalho-Zilovic Spread Spectrum (RZSS) techniques. An RZSS library allows encoding of any bytes of data in an ultrasound emission that is played by a speaker of a device and decoded at a device receiving the ultrasound emission. In one embodiment, an ultrasound emission can take 512 milliseconds to transfer one 8-byte packet of data using RZSS techniques. The sent data packet can be a unique device identifier (token) periodically generated by a server, such as the conference server 130, and assigned to a device, such as the device 102.

For devices to distinguish tokens, the tokens are to be unique for an active meeting pool and the devices associated with the meeting participant determine if an emitting endpoint is on the same conference call. In one example, the token is created by a server, such as the conference server 130, and the server holds information about token-meeting relations. In another example, a token is generated locally based on a unique participant ID known to all devices associated with meeting participants. This technique can be called Contributing Source Identifier (CSI).

In another embodiment, the data packet can be generated by the device itself, based on a unique identifier associated with the device. With RZSS a device may not be detected until the whole ultrasound emission has gone through and been decoded. In one embodiment, after the initial determination is made that two or more devices are in proximity to one another, ultrasound emission detections can be accomplished in short time frames to ascertain that the two or more devices are still likely in proximity to one another. For example, an ultrasound emission can be detected, without decoding, in short intervals of 30-50 milliseconds. This can be referred to as low latency ultrasound detection. In one example, the device 102 can be determined to be in proximity 118 to the devices 104, 106, and 108 at the initiation of a conference call using ultrasound emissions and detections. The devices 102, 104, 106, and 108 may then be paired together in an audio group.

Detection of RSZZ emissions that are in 512 millisecond packets can be accomplished using two different mechanisms. The first mechanism can be a full-fledged RZSS decoder that may take a 512 millisecond message and then provide the exact content of the message. The second mechanism can be a low latency ultrasound detector that is able to determine that there is some message being broadcasted with 30-50 millisecond latency. The techniques presented herein may use both mechanisms in combination with one another. For example, after a RZSS emission has started at time X, around time X+(30-50 ms) the low latency ultrasound detector (the second mechanism) can report that a transmission is ongoing, and around time X+512 ms the RZSS decoder (the first mechanism) will report the actual message. The two mechanisms may also be referred to as two algorithms. The two mechanisms can be accomplished in parallel or in series with one another.

In one example, with RZSS techniques, when a device is emitting an ultrasound then the device cannot detect a different device that is also emitting ultrasound. In one embodiment of the present technology, a device will check, using low latency ultrasound detection, if any ultrasound emissions from other devices are ongoing before the device begins an ultrasound emission. If an ultrasound emission from another device is ongoing, then the device will wait until that ultrasound emission has been completed before beginning an ultrasound emission.

During the conference call, low latency ultrasound detections repeated at a periodic basis can be used to determine the device 102 is no longer in proximity 118 to the devices 104, 106, and 108. For example, the participant associated with the device 102 may have walked out of the conference room 120 with the device 102. In such an example, after the device 102 is no longer detected in proximity 118, then the device 102 can unpair the device 102 from the audio group. In one embodiment, low latency ultrasound detection can be used to determine if a device has left proximity in a time frame of 3-4 seconds. For example, if a period of time is detected without a successful ultrasound transmission from a device in the audio group, then another device in the audio group can determine if any ongoing transmissions are being received. If no ongoing ultrasound transmissions are detected, the device 102 may be assumed to have left the conference room 120 and is no longer in proximity 118. The period of time without a successful ultrasound transmission can be referred to as a timeout period.

In one example of the present technology, a second layer of proximity detection can be used in conjunction with or in place of ultrasound detection. The second layer of proximity detection can include wireless local area network (Wi-Fi) location detection. For example, the device 104 can be detected to be in the vicinity of a wireless network or access point associated with the wireless network. The device may or may not be connected to the wireless network or access point.

Devices with enabled Wi-Fi periodically scan for Wi-Fi access points in their vicinity. The results of those scans, which include a list of discovered Wi-Fi access points and their respective signal strengths, can be shared with a server, such as the conference server 130. The server can then infer that devices could be in proximity when their observed access points and the corresponding signal strengths are correlated. Devices can also share reports of ultrasound emission detections, which can be periodic and include the time instants of ultrasound emission detections during the last scanning interval. The proximity decisions that utilize Wi-Fi scan reports can be made more robust when the reports on ultrasound emission detections by several devices are also correlated, and if the Wi-Fi scan reports and ultrasound emission detection reports are combined using sensor fusion methods.

In one embodiment, the conference server 130 can automatically pair devices based on the Wi-Fi enhanced proximity detection. In another embodiment, it can offer an assisted pairing by prompting the users to manually pair their device with the likely proximate devices from the same call.

The second layer of proximity detection can include any number of different techniques for determining the location of a device. The second layer of proximity detection can be run in parallel to a first layer of proximity detection. The first layer of proximity detection can be ultrasound proximity detection which can include two mechanisms run in series or parallel. In one example, a short-range wireless technology such as Bluetooth™ wireless technology can be used to determine if two or more devices are in proximity to one another. For example, if the device 102 and the device 104 are paired to one another via Bluetooth then it can be determined that the devices are in proximity to one another. In one embodiment, video can be used to detect other devices are in proximity. Radio transmissions used by wireless networks and Bluetooth can pass through walls. Therefore, determining locations and proximity using radio transmissions can lead to a scenario where two devices are determined to be close to one another but there may be a wall located between the two devices. Therefore, radio transmissions are not always reliable for proximity detection. In one embodiment, both ultrasound and radio transmissions are used for determining proximity of two or more devices.

In one example, a conference call is initiated and the devices 102 and 104 are initially detected as in proximity to one another in the conference room 120 while the device 106 is not initially detected as in proximity to the devices 102 and 104. During the conference call the user associated with device 106 enters the conference room 120. The device 102 or 104 may detect ultrasound activity from the device 106 after the device 106 has entered the conference room 120 during the conference call, but the ultrasound transmission from the device 106 has not yet been decoded. In this example, radio transmissions can then be relied upon, such as wireless network proximity reports, to determine that the device 106 is now in proximity 118 before the ultrasound transmission is decoded. In this example, the device 106 may receive a request from the conference server 130 to inhibit the microphone and speaker associated with the device 106. Thus, howling/echo caused by the device 106 entering the proximity 118 can be prevented or minimized before the device 106 is fully detected using ultrasound techniques, such as RZSS. In another example, a device such as the device 108 may not be capable of emitting and detecting ultrasounds. In such an example, the second layer of proximity detection may be relied upon to determine the proximity of the device 108 to other devices without relying upon ultrasound emissions. Thus, the present techniques can rely upon ultrasound detections alone or rely upon a combination of ultrasound detections in combination with the second layer of proximity detection, or rely upon the second layer of proximity detection alone to determine proximity.

In one embodiment, a user interface on a device associated with the conference call can be used by a participant to manually join or leave an audio group. Therefore, a participant can manually choose to leave an audio group when walking out of a room or to join an audio group when walking into a room. Upon joining an audio group, either manually or automatically, a microphone and speaker associated with the device may be inhibited. Upon leaving an audio group, either manually or automatically, a microphone and speaker associated with the device may be enabled. If a device was selected as the one speaker, or leader, to be active during the conference call for an audio group and that device leaves the audio group, a different device in the audio group will be selected by one of the devices in the audio group to have an associated speaker uninhibited, unmuted, or enabled. Alternatively, the conference server 130 can select the speaker of the different device to be enabled. The speaker can be referred to as a loudspeaker. By muting all the microphones and speakers associated with devices that are in proximity to one another except for one microphone and speaker can prevent howling/echoes. For example, if all speakers in proximity to one another are playing audio associated with the conference call, microphones in the room may pick up feedback from the other speakers. This may occur even if all microphones are inhibited except one microphone, and all speakers continue to play audio associated with the conference call. In such a scenario, the speakers of different devices may be playing back audio associated with the conference call at different speeds or with different delays due to network latency which can also cause echoes. The one microphone and speaker may or may not be associated with the same device in the audio group. Selecting the one microphone and the one speaker can be selected using different techniques. In one embodiment, muting the microphones and speakers of devices in an audio group may be transparent to the participants associated with the devices. In other words, a user interface may not indicate to the participants which microphone(s) and speaker(s) have been selected and which microphone(s) and speakers(s) have been inhibited. In one embodiment, a participant may be able to manually select which microphone and speaker are selected for the audio group and which microphone(s) and speakers(s) are inhibited. In this example, the participant may be able to manually switch which microphone and speaker are selected for the audio group.

A device in an audio group that is selected to have the speaker uninhibited can be referred to as the leader. The devices in an audio group that have been selected to have loudspeakers inhibited can be referred to as the followers. It should be appreciated that in the techniques presented herein, a system may have multiple audio groups associated with the same conference call where each audio group can have devices that are in proximity to one another and each audio group can have a leader device with follower devices. In other words, there can be multiple groups, each group in a corresponding huddle or conference room. The conference server 130 may make one selection (for microphone and loudspeaker audio) per huddle room.

The conference server 130 can track each of the audio groups with an identity of each leader and follower devices meaning the conference server 130 can track the roles that the devices have chosen to take.

The process of leader selection can be distributed or centralized. In the former, devices execute a leader election protocol at the end of which one leader emerges, while in the latter, the leader is delegated by a server.

At any point in time, a microphone from a device in an audio group captures sound better than others. In one example, this can be the microphone of the device closest to the person currently speaking. The selection of the best audio stream from an audio group can be done by a server; the server can decide to forward the selected audio stream and inhibit (drop) the other audio streams from the audio group. In a similar way, the selection of the best audio stream from an audio group can be done by a device that plays back audio. This can be a conference participant device that is not part of any audio group or part of another audio group. The audio stream selected for forwarding or playback, while the other audio streams from the same group are inhibited, is referred to as the playback audio stream or simply the selected audio stream. It should be noted that the playback audio stream can, but does not have to come from the leader of an audio group. The device that performs audio stream selection from an audio group, which can be a server or an endpoint device that plays back audio, is referred to as an audio stream selector.

To be clear, if three users (and their associated devices) Fred, Wilma and Barney are in a conference call in different rooms, each person's audio will be sent to the other two people. However, if Fred and Wilma are in the same room, Fred's audio should never be sent to Wilma and Wilma's audio should never be sent to Fred (or alternatively should be deleted at the receiver of the other). Not sending Wilma's audio to Fred (or vice versa) involves determining/knowing that they are in the same room. Determining whether Fred's or Wilma's audio should be the audio that is played by Barney may involve using one or more audio metrics.

In one example, one of the audio streams associated with the devices 102, 104, 106, and 108 that are in proximity to one another can be selected as the playback audio stream. For example, the audio stream of the device 102 can be chosen as the playback audio stream and the audio streams associated with the devices 104, 106, and 108 can be inhibited at the conference server 130. Selecting the playback audio stream can occur automatically. An automatic choice of the playback audio stream can be based on one or more audio metrics associated with each audio stream. The conference server 130 can obtain one or more audio metrics for each of the audio streams associated with each of the devices. An algorithm can be employed to select the best audio stream based on the one or more audio metrics. The selection can have the goal of choosing the audio stream that has the most clear, intelligible, loud, reverb-less and echo-less signal. The best audio stream may be the audio stream that allows all participants in proximity to one another to be heard.

The audio metrics can include, but are not limited to loudness, an estimated Signal-to-Noise Ratio (SNR), clarity, intelligibility, a degree of reverb, and/or a degree of echo. Loudness or audio loudness can be as defined in the RFC6464 protocol. In one embodiment, the SNR can be computed with the help of a noise removal algorithm. Input to the noise removal algorithm can be noisy speech and the output is "clean" speech. The ratio of energy between the clean speech and the denoising residual (the difference between the noisy and clean speech) is an estimated SNR. In one embodiment, a weighted average of SNR can be used where the energy level of the signal is in proportions of 3:1. In this embodiment, both loudness and SNR can be normalized to the same scale before calculating the final metric. In one embodiment, video streams associated with each of the audio streams of the devices are used to select the playback audio stream. The use of video streams with the techniques presented herein can also enhance video framing.

In one embodiment, facial key points can be extracted from a video associated with user and used for lip motion analysis, and subsequently used as video-based voice activity indicators sent to the audio stream selector. The audio stream selector can in turn use the mentioned video-based voice activity indicators in conjunction with audio-only metrics (e.g., as a scaled weighted average) for improved audio stream selection. In one example, the video-based voice activity indicator may be added to audio stream metadata.

Selecting a device to play the audio stream (i.e., which device is selected to be the leader) can be done dynamically. For example, a first device can be selected to play the playback audio stream and a second device from the group can be dynamically selected to play the playback audio stream either because the first device left the room or was turned off.

Separate from leader selection, another audio stream can also be selected based on one or more audio metrics. In one embodiment, the conference server 130 continuously monitors the audio metrics of each device in proximity to one another. During the conference call, based on the continuous monitoring of the audio metrics, the conference server 130 can determine that the playback audio stream is no longer the "best" candidate. In such an embodiment, the conference server 130 can switch to the second audio stream (effectively enabling the microphone associated with the second device and inhibiting the microphone of the first device). Thus, the selected audio stream of the second device can become the new playback audio stream.

Figure 2:
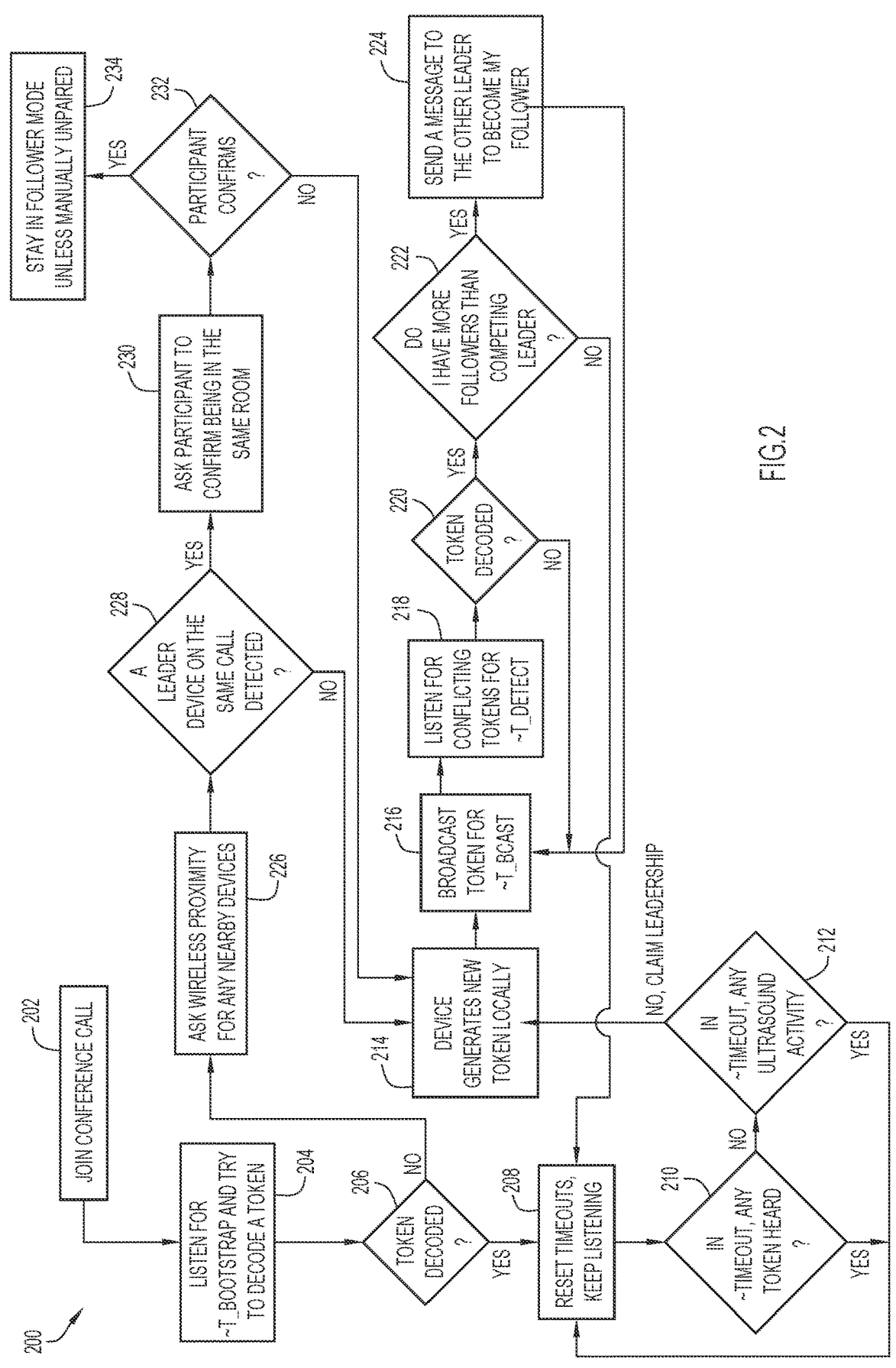
FIG. 2 is a flow chart of a method for preventing echo in a conference call, according to an example embodiment.

Reference is now made to FIG. 2, which illustrates a flow chart for a method 200 for selecting a leader in an audio group in a conference call. This method 200 is applicable to operation of any of the devices, cloud computers, mechanisms, and engines presented herein. The method 200 includes, at step 202, a device joining a conference call. The device can be the device 102 of FIGS. 1A and 1B. At step 204, the device can listen for a period of time (denoted as ~T_BOOTSTRAP) and try to decode ultrasound tokens. In one embodiment, a token contains a unique participant identifier, allowing to detect and identify any leader device or devices that are in close proximity. In one example, listening for ~T_BOOTSTRAP can take a random time between 1-3 seconds. If a token is decoded, at step 206, then the device becomes a follower of the leader that played the token, and keeps listening for leader's tokens for ~TIMEOUT at step 208. Then, if the device in a timeout period denoted ~TIMEOUT has detected a token again, at step 210, then the device proceeds back to step 208 and stays in the follower role. If the device in ~TIMEOUT has not detected a token, at step 210, then the device proceeds to step 212. If in ~TIMEOUT any ultrasound activity has been detected (low latency ultrasound detection), at step 212, the device proceeds back to step 208 (stays in the follower role). If in ~TIMEOUT any ultrasound activity has not been detected, at step 212, the device determines that either the follower device itself, or the leader device has left the room and proceeds into the leader role of the audio group for the conference call and proceeds to step 214. In one example, listening for ~TIMEOUT can take a random time between 3-4 seconds. If the leader left the room, that leader becomes the leader of a new group of size 1 and then a new leader is to be selected for the previous group. If a follower device has left the room, then the device is effectively in a new audio group and becomes a leader for the new audio group. If the leader left the room, a random delay factor is added to the TIMEOUT so that most likely there is one follower device that times out first, and that device becomes the new leader. If there is more than one device that become a leader in this process, the mechanism that detects a leader conflict (step 220) ensures that in a short period of time, there will be only one leader of the audio group. The leader can be chosen randomly among the devices that are in an audio group or room. Alternatively, the participant with the highest quality or loudest loudspeaker, or the first participant to join the call in the room might be chosen.

If the token is not decoded at step 206, then the device proceeds to step 226 to employ wireless proximity detection to determine if any other devices are nearby. If another leader device is detected on the same conference call, at step 228, then the device proceeds to step 230. The device can ask a participant to confirm being in the same room as that leader device, at step 230, serving as a user-assisted wireless proximity detection notification. If the user confirms that, at step 232, then the device can stay in follower mode unless manually unpaired, at step 234. If, at step 228, there is no other leader device detected on the same conference call, the device proceeds to step 214. Similarly, at step 232, if the participant does not confirm being in the same room as the detected device, the device proceeds to step 214 to become a leader. At step 214, the device generates the new token locally, or may obtain the new token from the conference server. The device broadcasts the token for a time interval denoted T_BCAST, at step 216. In one example, playing out the ultrasound token for T_BCAST can take 2.2 seconds. Then, the device listens for conflicting tokens for ~T_DETECT, at step 218. In one example, listening for ~T_DETECT can take a random time between 1.2-2.5 seconds. At step 218, the device stops broadcasting ultrasound in order to be able to listen and detect potential conflicts with other devices broadcasting ultrasound (for instance, another leader devices that arrived in the room). If a token is not decoded at step 220, then the device proceeds back to step 216. If a token is decoded at step 220, then the device proceeds to step 222. If the device determines it does not have more followers than a competing leader, at step 222, then the device proceeds back to step 208 where the device steps down to follower mode. This can occur if the device enters a room during the conference call with an existing audio group that already has a leader. As a result, these two audio groups are merged into one. If the device has more followers than a competing leader, at step 222, then the device sends a message to the other leader to become a follower of the device, at step 224. At step 222, if there are two leaders with an equal follower count, the leader with the higher participant ID keeps the leader role. After step 224, the device proceeds back to step 216.

In one embodiment, an algorithm can select random times for T-BOOTSTRAP, T-BCAST, T-DETECT, and TIMEOUT between the time ranges described above.

Figure 3:
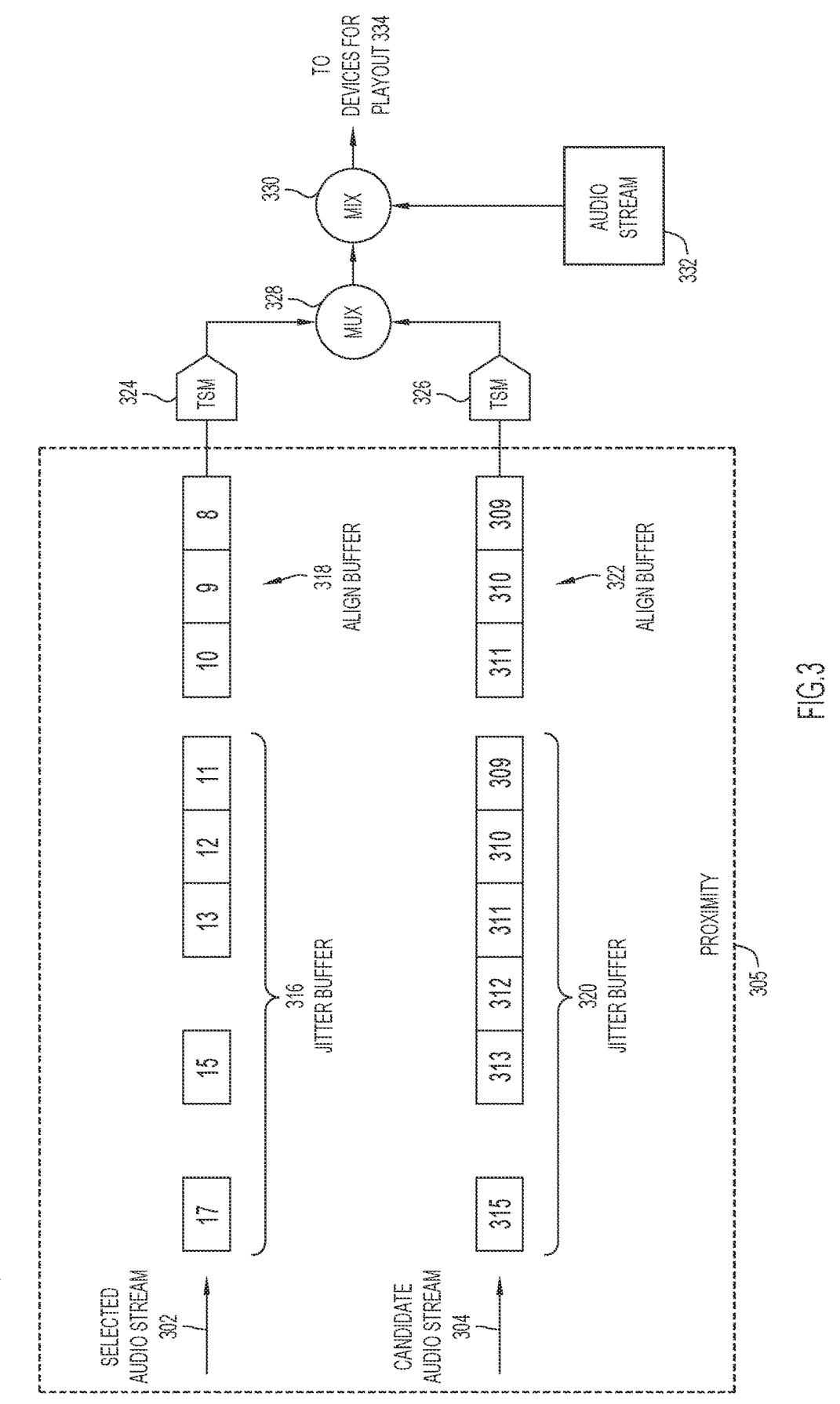
FIG. 3 is a diagram depicting an example process for aligning audio streams, according to an example embodiment.

FIG. 3 depicts a process 300 for aligning audio streams to prevent echo in accordance with techniques presented herein. In one embodiment, process 300 may be performed by the conference server shown in FIG. 1A. The conference server obtains a selected audio stream 302 and a candidate audio stream 304 that are associated with devices that are in a proximity 305 to one another. For example, the selected audio stream 302 can be associated with a first device. The candidate audio stream 304 can be associated with a second device. The first device and second device can be associated with the same conference call and the conference server has determined that they are in proximity 305 to one another.

During the conference call, the conference server may determine that the first audio stream is no longer to be the selected audio stream and the second audio stream is chosen as the candidate to be the new selected audio stream. However, the selected audio stream 302 and the candidate audio stream 304 may not be aligned with one another, meaning that one stream may be delayed relative to the other stream. The techniques presented herein provide an alignment technique for aligning the selected audio stream 302 and the candidate audio stream 304 before the second audio stream becomes the new selected audio stream for the group of devices that are in proximity 305 with one another. When an audio stream, such as the second audio stream becomes the new selected audio stream, then the audio stream can be handed off or switched to the microphone associated with the second device. The microphone associated with the second device may have previously been inhibited during the conference call.

The selected audio stream 302 is depicted as comprising audio blocks 8, 9, 10, 11, 12, 13, 15, and 17, associated with different time intervals of audio. A jitter buffer 316 is provided for the selected audio stream 302 to store the audio blocks 11, 12, 13, 15, and 17. An alignment buffer 318 is provided for the selected audio stream 302 to store the audio blocks 8, 9, and 10. The candidate audio stream 304 is depicted as having audio blocks 309, 310, 311, 312, 313, and 315. A jitter buffer 320 is provided for the candidate audio stream 304 that stores the audio blocks 309, 310, 311, 312, 313, and 315. An alignment buffer 322 is provided for the candidate audio stream 304 that stores audio blocks 309, 310, and 311. Misalignment between the selected audio stream 302 and the candidate audio stream 304 may occur due to network latency. For example, the first and second devices associated with the selected audio stream 302 and the candidate audio stream 304, respectively, may use different networks for communicating with the conference server. The first and second devices may use different types of network interface cards that can lead to differences in network latency. The switch or handoff between the selected audio stream 302 and the candidate audio stream 304 can have the goal of inaudible transitions together with the lowest possible end-to-end (E2E) delay.

FIG. 3 further shows time scale modifier (TSMs) 324 and 326 that are coupled to the alignment buffers 318 and 322, respectively. A multiplexer (MUX) 328 is coupled to the outputs of the TSMs 324 and 326. A mixer (MIX) 330 is coupled to the output of the MUX 328 and to audio stream 332. The output of the MIX 330 is sent to the user devices in the conference call for playout via their respective speakers, as shown at 334.

The misalignment between the selected audio stream 302 and the candidate audio stream 304 can be detected using a cross-correlation algorithm. In one example, the cross-correlation algorithm is a Generalized Cross-Correlation Phase Transform (GCC-PHAT) algorithm. The cross-correlation algorithm can compute a time delay between the two audio streams, indicating an amount of time that one signal is behind or ahead of the other. An audio stream that is ahead of another audio stream can be described as further advanced. In one example, the cross-correlation algorithm is fed 3 seconds of historical audio data for the selected audio stream 302 and the candidate audio stream 304. The cross-correlation algorithm can then calculate the drift or offset between the two audio streams. The drift can be referred to as a time-based drift.

If both the selected audio stream 302 and the candidate audio stream 304 have gone silent, then an immediate switch can be made to the candidate audio stream 304 without alignment. The audio stream selector can detect if the selected audio stream 302 and the candidate audio stream 304 are aligned. If the selected audio stream 302 and the candidate audio stream 304 are aligned, then an immediate switch can be made to candidate audio stream 304. If the audio stream selector determines a drift between the selected audio stream 302 and the candidate audio stream 304 is below a certain threshold, then the TSM 326 can be used to instantaneously switch to the candidate audio stream 304 and the audio can start to play out from the proper audio block sample within alignment buffer 322. This is depicted in the alignment buffer 322 where audio blocks 309 and 310 have been struck through. If the audio stream selector determines the drift between the selected audio stream 302 and the candidate audio stream 304 exceeds the buffer size of the alignment buffer 318 and the alignment buffer 322, then the audio stream selector may delay the switch to the candidate audio stream 304 until the TSM 324 or the TSM 326 can be used to slow down the stream that is not delayed until the more advanced stream is aligned. In one example, the stream that is ahead is slowed by 10% until the drift is eliminated. Slowing by 10% may take 1 second to eliminate one hundred milliseconds of drift. In one embodiment, after the slowdown has been completed, the audio metrics may be checked again to determine if a switch to the candidate audio stream 304 is still to be made.

In one embodiment, a time-based drift between the selected audio stream 302 and the candidate audio stream 304 is detected to be smaller than a size of the alignment buffer 318 and the alignment buffer 322. In such a scenario, a middle portion of the candidate audio stream 304 is obtained from the alignment buffer 322 to align the candidate audio stream 304 with the selected audio stream 302.

The MUX 328 may handle the switch from the selected audio stream 302 to the candidate audio stream 304. The MUX 328 can ensure that one audio stream is selected as the selected audio stream of the devices that are in proximity 305 to one another. The audio stream from the MUX 328 can then be passed to MIX 330 which can be used to mix the audio stream from the MUX 328 with an audio stream 332. The audio stream 332 can be from a device associated with the conference call that is not in proximity 305 to the first and second devices. The MIX 330 can be capable of mixing audio streams from a plurality of devices associated with the conference call. The MIX 330 can send the mixed audio stream to the one or more devices that is/are participating in the conference call. This technique for aligning and switching audio streams can be referred to as a dual-stage alignment technique and can also be referred to as a user tunable experience. Switching between audio streams can be more resource efficient as compared to mixing all audio streams or beamforming.

In one embodiment, a server or set of servers in mesh or cascaded infrastructure can filter streams based on quality metrics. To limit latency, the server may not perform alignment and instead performs filtering based on quality metrics added to audio stream as metadata. The consequence of such filtering is that a decision about dropping a worse faster stream will be postponed until a better slower stream arrives. This technique can give a receiver additional time for fade-in/fade-out.

The techniques presented herein are for seamless teleconferencing. The techniques involve four concepts: (1) detecting that a subset of devices associated with a conference call are in proximity to one another, (2) selecting one of the devices in proximity to one another to be the leader, enabling or unmuting its speaker and inhibiting the speakers of all other devices in its proximity, (3) continuously selecting an audio stream associated with one of the microphones of one of the devices in proximity to one another to be a selected audio stream, and (4) aligning audio streams before switching to a new selected audio stream associated with a second microphone of a second device. It should be appreciated that the four concepts can be employed independent of one another, can be employed in combination with one other concept, or all four concepts can be employed in combination with one another to prevent echoes in a conference call and select the best audio stream.

Turning now to FIG. 4, a flow chart is shown for a method 400 for seamless teleconferencing. The method 400 can be a computer-implemented method. This method 400 is applicable to operation of any of the devices, cloud computers, mechanisms, and engines presented herein. The method 400 includes, at step 410, selecting a first microphone for an audio call, the first microphone associated with a first device of multiple devices that are in proximity to one another and are each connected to the audio call. The method 400 further includes, at step 420, selecting a first speaker for the audio call, the first speaker associated with one of the multiple devices. The method 400 further includes, at step 430, inhibiting audio associated with all microphones and speakers associated with the multiple devices except for the first microphone and the first speaker. The method 400 further includes, at step 440, switching to a second microphone associated with a second device of the multiple devices after a period of time by aligning audio streams of the first microphone and of the second microphone, inhibiting audio associated with the first microphone after the aligning, and enabling audio associated with the second microphone.

Turning now to FIG. 5, a flow chart is shown for a method 500 for seamless teleconferencing. The method 500 can be a computer-implemented method. This method 500 is applicable to operation of any of the devices, cloud computers, mechanisms, and engines presented herein. The method 500 includes, at step 510, detecting multiple devices are in proximity to one another and are each connected to an audio call, each of the multiple devices having at least one associated microphone. The method 500 further includes, at step 520, obtaining a plurality of audio metrics for each of the multiple devices during the audio call, the plurality of audio metrics including at least loudness. The method 500 further includes, at step 530, selecting a first microphone associated with a first device to use for the audio call based on the plurality of audio metrics. The method 500 further includes, at step 540, inhibiting all microphones associated with the multiple devices except for the first microphone of the first device.

In some aspects, the techniques described herein relate to a method, including: detecting multiple devices are in proximity to one another and are each connected to an audio call, each of the multiple devices having at least one associated microphone; obtaining a plurality of audio metrics for each of the multiple devices during the audio call, the plurality of audio metrics including at least loudness; selecting a first microphone associated with a first device to use for the audio call based on the plurality of audio metrics; and inhibiting all microphones associated with the multiple devices except for the first microphone of the first device.

In some aspects, the techniques described herein relate to a method, wherein the plurality of audio metrics includes an estimated relation between the speech signal and noise in the audio stream such as the Signal-to-Noise Ratio (SNR).

In some aspects, the techniques described herein relate to a method, further including: detecting a change in the audio metrics for either the first microphone or a second microphone associated with a second device of the multiple devices during the call; and switching to the second microphone for the audio call based on the change in the audio metrics.

In some aspects, the techniques described herein relate to a method, further including: aligning audio streams of the first microphone and the second microphone, wherein switching is performed after alignment of audio streams of the first microphone and the second microphone.

In some aspects, the techniques described herein relate to a method, wherein the aligning the audio streams of the first microphone and the second microphone further includes: detecting a time-based drift between audio streams of the first microphone and the second microphone that is exceeding an alignment buffer size; delaying a further advanced one of the audio streams of the first microphone and of the second microphone; and performing the switching to the second microphone after the audio streams of the first microphone and second microphone are aligned based on the delaying.

In some aspects, the techniques described herein relate to a method, wherein the audio metrics further include clarity, intelligibility, a degree of reverb, and degree of echo.

In some aspects, the techniques described herein relate to a method, wherein the detecting the multiple devices are in proximity to one another is performed via ultrasound emissions and detections.

In some aspects, the techniques described herein relate to a method, further including: removing a particular device from the multiple devices for the audio call when the ultrasound emissions are no longer detected from the particular device.

In some aspects, the techniques described herein relate to a method, further including: removing a particular device from the multiple devices for the audio call when the device has left the conference call.

In some aspects, the techniques described herein relate to a method, wherein the detecting the multiple devices are in proximity to one another is accomplished via a combination of ultrasound emissions and detections, wireless local area network proximity detection, video detection, and/or Bluetooth detection.

In some aspects, the techniques described herein relate to a method, wherein the audio call is part of a communication session that has an associated video stream, the method further comprising identifying the second microphone based on the video stream.

Turning now to FIG. 6, a flow chart is shown for a method 600 for seamless teleconferencing. The method 600 can be a computer-implemented method. This method 600 is applicable to operation of any of the devices, cloud computers, mechanisms, and engines presented herein. The method 600 includes, at step 610, emitting an ultrasound signal at a plurality of devices associated with an audio call, the ultrasound signal being detectable at the plurality of devices. The ultrasound signal can include control information sent to other devices. The method further includes, at step 620, detecting the ultrasound signal that is playing on a first device of the plurality of devices via a microphone of a second device of the plurality of devices. Steps 610 and 620 are a first layer of proximity detection. The method 600 further includes, at step 630, detecting a location of the first device and a location of the second device via a second layer of proximity detection. The method 600 further includes, at step 640, determining that the first device and the second device are in proximity to one another based on the first layer of proximity detection and the second layer of proximity detection. The method 600 further includes, at step 650, forming an audio group of the plurality of devices that are in proximity to one another including the first device and the second device for the audio call.

In some aspects, the techniques described herein relate to a method for seamless teleconferencing, including: emitting an ultrasound signal at a plurality of devices associated with an audio call, the ultrasound signal being detectable at the plurality of devices. The ultrasound signal can include control information sent to other devices. The method further involves detecting the ultrasound signal that is playing on a first device of the plurality of devices via a microphone of a second device of the plurality of devices; detecting a location of the first device and a location of the second device via a second layer of proximity detection; determining that the first device and the second device are in proximity to one another based on the detecting the first layer of proximity detection and the second layer of proximity detection; and forming an audio group of the plurality of devices that are in proximity to one another including the first device and the second device for the audio call.

In some aspects, the techniques described herein relate to a method, wherein the second layer of proximity detection uses wireless local area network proximity detection, video detection, and/or Bluetooth detection. The first layer may be ultrasound proximity detection which can include more than one technique that can be accomplished in series or parallel to one another.

In some aspects, the techniques described herein relate to a method, further including: selecting a first microphone to use for the audio call for the audio group, the first microphone being associated with at least one of the devices in the audio group; and inhibiting all microphones associated with the audio group except for the first microphone.

In some aspects, the techniques described herein relate to a method, further including: continuing to monitor proximity of devices in the audio group during the audio call based on ultrasound detection; detecting a change in proximity in the first device; and switching to a second speaker associated with at least one other device in the audio group for the audio call based on the change in the proximity.

In some aspects, the techniques described herein relate to a method, further including: aligning audio streams of the first microphone and the second microphone, wherein the switching is performed after the aligning audio streams of the first microphone and second microphone.

In some aspects, the techniques described herein relate to a method, wherein the aligning the audio streams of the first microphone and the second microphone further includes: detecting a time-based drift between audio streams of the first microphone and the second microphone that is exceeding an alignment buffer size; delaying a further advanced of the audio streams of the first microphone; and performing the switching to the second microphone after the audio streams of the first microphone and second microphone are aligned based on the delaying.

In some aspects, the techniques described herein relate to a method, further including: obtaining a plurality of audio metrics for each of the multiple devices during the audio call, the plurality of audio metrics including at least loudness and an estimated quality metric such as Signal to Noise Ratio (SNR); wherein the determining the first microphone is based on the audio metrics; and wherein the switching to the second microphone is based on the audio metrics.

Figure 7:
FIG. 7 is a block diagram of a computing or networking apparatus that may manage a conference call and perform the techniques for preventing echo in a conference call, according to an example embodiment.

FIG. 7 illustrates a hardware block diagram of a device 700 that may perform functions associated with operations discussed herein in connection with the techniques depicted in FIGS. 1A, 1B, 2, and 3. For example, the device 700 can be any of the devices of FIGS. 1A and 1B including the device 102 or the conference server 130.

In at least one embodiment, the device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for device 700 can overlap in any manner and are not limited to the specific allocation of instructions and/or operations described herein.

In at least one embodiment, processor(s) 702 is/are at least one hardware processor configured to execute various tasks, operations and/or functions for device 700 as described herein according to software and/or instructions configured for device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method including: selecting a first microphone for an audio call, the first microphone associated with a first device of multiple devices that are in proximity to one another and are each connected to the audio call; selecting a first speaker for the audio call, the first speaker associated with one of the multiple devices; inhibiting audio associated with all microphones and speakers associated with the multiple devices except for the first microphone and the first speaker; and switching to a second microphone associated with a second device of the multiple devices after a period of time by aligning audio streams of the first microphone and of the second microphone, inhibiting audio associated with the first microphone after the aligning, and enabling audio associated with the second microphone.

In some aspects, the techniques described herein relate to a method, wherein detecting the multiple devices are in proximity to one another is based on ultrasound emissions and detections.

In some aspects, the techniques described herein relate to a method, wherein the ultrasound emissions and detections are repeated on a periodic basis.

In some aspects, the techniques described herein relate to a method, further including: removing a particular device from the multiple devices for the audio call when the ultrasound emissions are no longer detected from the particular device during a period of time associated with the periodic basis.

In some aspects, the techniques described herein relate to a method, further including: detecting that a new device is in proximity to the multiple devices during the audio call; and inhibiting audio associated with a microphone and a speaker associated with the new device.

In some aspects, the techniques described herein relate to a method, wherein detecting the multiple devices are in proximity to one another is based on a combination of ultrasound emissions and detections with one or more of wireless local area network proximity detection, video detection, or short-range wireless communication detection.

In some aspects, the techniques described herein relate to a method, further including: obtaining one or more audio metrics for each of the multiple devices during the audio call, wherein the selecting the first microphone is based on the one or more audio metrics and the switching to the second microphone is based on the one or more audio metrics.

In some aspects, the techniques described herein relate to a method, wherein the aligning the audio streams of the first microphone and the second microphone further includes: detecting a time-based drift between audio streams of the first microphone and the second microphone that is exceeding an alignment buffer size; delaying a further advanced one of the audio streams of the first microphone and of the second microphone; and performing the switching to the second microphone after the audio streams of the first microphone and second microphone are aligned based on the delaying the further advanced one of the audio streams.

In some aspects, the techniques described herein relate to a method, wherein the aligning the audio streams of the first microphone and the second microphone further includes: detecting a time-based drift between audio streams of the first microphone and the second microphone that is smaller than an alignment buffer size; and obtaining from a middle portion of an alignment buffer, the audio stream associated with the second microphone.

In some aspects, the techniques described herein relate to a method, wherein the audio call is part of a conference call that has an associated video stream, the method further including identifying the second microphone based on the associated video stream.

In some aspects, the techniques described herein relate to a method, further including: switching to a second speaker after a device associated with the first speaker is no longer in proximity to the multiple devices.

In some aspects, the techniques described herein relate to a method, wherein the first microphone and the first speaker are associated with the first device of the multiple devices.

In some aspects, the techniques described herein relate to a method, wherein the first microphone is associated with the first device of the multiple devices and the first speaker is associated with a third device of the multiple devices.

In some aspects, the techniques described herein relate to a method, wherein the first microphone is selected from a plurality of microphones associated with the first device of the multiple devices.

In some aspects, the techniques described herein relate to a method, wherein inhibiting the audio associated with a given device of the multiple devices is performed by one of: muting a microphone associated with the given device; dropping or attenuating by a conference server an audio signal associated with the given device; or dropping or attenuating an audio signal received at another device from the given device.

In some aspects, the techniques described herein relate to an apparatus including: a memory; a network interface configured to enable network communications to communicate with multiple devices participating in an audio call; and a processor, wherein the processor is configured to perform operations on behalf of a conference server that is supporting the audio call among the multiple devices, the operations including: selecting a first microphone for the audio call, the first microphone associated with a first device of the multiple devices that are in proximity to one another and are each connected to the audio call; selecting a first speaker for the audio call, the first speaker associated with one of the multiple devices; inhibiting audio associated with all microphones and speakers associated with the multiple devices except for the first microphone and the first speaker; and switching to a second microphone associated with a second device of the multiple devices after a period of time by aligning audio streams of the first microphone and of the second microphone, inhibiting audio associated with the first microphone after the aligning, and enabling audio associated with the second microphone.

In some aspects, the techniques described herein relate to an apparatus, wherein the audio call is part of a conference call that has an associated video stream, the operations further including identifying the second microphone based on the associated video stream.

In some aspects, the techniques described herein relate to an apparatus, further including: switching to a second speaker after a device associated with the first speaker is not in proximity to the multiple devices.

In some aspects, the techniques described herein relate to an apparatus, wherein the aligning the audio streams of the first microphone and the second microphone further includes: detecting a time-based drift between audio streams of the first microphone and the second microphone that is exceeding an alignment buffer size; delaying a further advanced one of the audio streams of the first microphone and of the second microphone; and performing the switching to the second microphone after the audio streams of the first microphone and second microphone are aligned based on the delaying the further advanced one of the audio streams.

In some aspects, the techniques described herein relate to an apparatus, further including: obtaining one or more audio metrics for each of the multiple devices during the audio call, wherein the selecting the first microphone is based on the one or more of audio metrics and the switching to the second microphone is based on one or more audio metrics.

In some aspects, the techniques described herein relate to an apparatus including: at least one microphone including a first microphone; at least one speaker; a network interface configured to enable network communications to communicate with a conference server to participate in an audio call supported by the conference server with multiple devices; and a processor configured to perform operations for a first device, the operations including: selecting the first microphone of the first device for the audio call, the first device determined to be in proximity to the multiple devices, wherein audio associated with all microphones associated with the multiple devices except for the first microphone are inhibited; and inhibiting audio associated with the first microphone when audio for the audio call is switched to a second microphone associated with a second device of the multiple devices, wherein audio streams of the first microphone and of the second microphone are aligned after a period of time before being switched.

In some aspects, the techniques described herein relate to an apparatus, wherein the processor is configured to further perform: inhibiting audio of the at least one speaker after a speaker associated with a third device of the multiple devices is selected to play audio for the audio call.

In some aspects, the techniques described herein relate to an apparatus, wherein the processor is further configured to detect the multiple devices are in proximity to one another based on ultrasound emissions and detections of ultrasound emissions.

In some aspects, the techniques described herein relate to an apparatus, wherein the processor is further configured to detect the multiple devices are in proximity to one another based on a combination of ultrasound emissions and detections with one or more of wireless local area network proximity detection, video detection, or short-range wireless communication detection.

In some aspects, the techniques described herein relate to an apparatus, wherein the processor is further configured to perform: obtaining a plurality of audio metrics for each of the multiple devices during the audio call, the plurality of audio metrics including at least loudness and a quality metric; wherein the selecting the first microphone is based on the plurality of audio metrics and switching to the second microphone is based on the plurality of audio metrics.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connect utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
selecting a first microphone for an audio call, the first microphone associated with a first device of multiple devices that are in proximity to one another and are each connected to the audio call;
selecting a first speaker for the audio call, the first speaker associated with one of the multiple devices;
inhibiting audio associated with all microphones and speakers associated with the multiple devices except for the first microphone and the first speaker; and
switching to a second microphone associated with a second device of the multiple devices after a period of time by:
comparing a time-based drift between audio streams of the first microphone and of the second microphone to an alignment buffer size;
aligning, based on the comparing, the audio streams of the first microphone and of the second microphone, inhibiting audio associated with the first microphone after the aligning, and
enabling audio associated with the second microphone.

2. The method of claim 1, wherein detecting the multiple devices are in proximity to one another is based on ultrasound emissions and detections.

3. The method of claim 2, wherein the ultrasound emissions and detections are repeated on a periodic basis.

4. The method of claim 3, further comprising:
removing a particular device from the multiple devices for the audio call when the ultrasound emissions are no longer detected from the particular device during a period of time associated with the periodic basis.

5. The method of claim 1, further comprising:
detecting that a new device is in proximity to the multiple devices during the audio call; and
inhibiting audio associated with a microphone and a speaker associated with the new device.

6. The method of claim 1, wherein detecting the multiple devices are in proximity to one another is based on a combination of ultrasound emissions and detections with one or more of wireless local area network proximity detection, video detection, or short-range wireless communication detection.

7. The method of claim 1, further comprising:
obtaining one or more audio metrics for each of the multiple devices during the audio call,
wherein the selecting the first microphone is based on the one or more audio metrics and the switching to the second microphone is based on the one or more audio metrics.

8. The method of claim 1, wherein the aligning, based on the comparing, the audio streams of the first microphone and of the second microphone further comprises:
detecting the time-based drift between the audio streams of the first microphone and of the second microphone exceeds the alignment buffer size;
delaying a further advanced one of the audio streams of the first microphone and of the second microphone; and
performing the switching to the second microphone after the audio streams of the first microphone and of the second microphone are aligned based on the delaying the further advanced one of the audio streams.

9. The method of claim 1, wherein the aligning, based on the comparing, the audio streams of the first microphone and of the second microphone further comprises:
detecting the time-based drift between the audio streams of the first microphone and of the second microphone is smaller than the alignment buffer size; and
obtaining from a middle portion of an alignment buffer, an audio stream associated with the second microphone.

10. The method of claim 1, wherein the audio call is part of a conference call that has an associated video stream, the method further comprising identifying the second microphone based on the associated video stream.

11. The method of claim 1, further comprising:
switching to a second speaker after a device associated with the first speaker is no longer in proximity to the multiple devices.

12. The method of claim 1, wherein the first microphone and the first speaker are associated with the first device of the multiple devices.

13. The method of claim 1, wherein the first microphone is associated with the first device of the multiple devices and the first speaker is associated with a third device of the multiple devices.

14. The method of claim 1, wherein the first microphone is selected from a plurality of microphones associated with the first device of the multiple devices, and wherein the time-based drift is determined using a cross-correlation algorithm.

15. The method of claim 1, wherein inhibiting the audio associated with a given device of the multiple devices is performed by one of: muting a microphone associated with the given device; dropping or attenuating by a conference server an audio signal associated with the given device; or dropping or attenuating an audio signal received at another device from the given device.

16. An apparatus comprising:

a memory;

a network interface configured to enable network communications to communicate with multiple devices participating in an audio call; and a processor, wherein the processor is configured to perform operations on behalf of a conference server that is supporting the audio call among the multiple devices, the operations including:

selecting a first microphone for the audio call, the first microphone associated with a first device of the multiple devices that are in proximity to one another and are each connected to the audio call;

selecting a first speaker for the audio call, the first speaker associated with one of the multiple devices;

inhibiting audio associated with all microphones and speakers associated with the multiple devices except for the first microphone and the first speaker; and switching to a second microphone associated with a second device of the multiple devices after a period of time by:

comparing a time-based drift between audio streams of the first microphone and of the second microphone to an alignment buffer size;

aligning, based on the comparing, the audio streams of the first microphone and of the second microphone, inhibiting audio associated with the first microphone after the aligning, and enabling audio associated with the second microphone.

17. The apparatus of claim 16, wherein the audio call is part of a conference call that has an associated video stream, the operations further comprising identifying the second microphone based on the associated video stream.

18. The apparatus of claim 16, further comprising:

switching to a second speaker after a device associated with the first speaker is not in proximity to the multiple devices.

19. The apparatus of claim 16, wherein the aligning, based on the comparing, the audio streams of the first microphone and of the second microphone further comprises:

detecting the time-based drift between the audio streams of the first microphone and of the second microphone exceeds the alignment buffer size;

delaying a further advanced one of the audio streams of the first microphone and of the second microphone; and performing the switching to the second microphone after the audio streams of the first microphone and of the second microphone are aligned based on the delaying the further advanced one of the audio streams.

20. The apparatus of claim 16, further comprising:

obtaining one or more audio metrics for each of the multiple devices during the audio call, wherein the selecting the first microphone is based on the one or more of audio metrics and the switching to the second microphone is based on the one or more audio metrics.

21. An apparatus comprising:

at least one microphone including a first microphone;

at least one speaker;

a network interface configured to enable network communications to communicate with a conference server to participate in an audio call supported by the conference server with multiple devices; and a processor configured to perform operations for a first device, the operations including:

selecting the first microphone of the first device for the audio call, the first device determined to be in proximity to the multiple devices, wherein audio associated with all microphones associated with the multiple devices except for the first microphone are inhibited; and inhibiting audio associated with the first microphone when audio for the audio call is switched to a second microphone associated with a second device of the multiple devices, wherein audio streams of the first microphone and of the second microphone are aligned after a period of time before being switched based on a comparison of a time-based drift between the audio streams of the first microphone and of the second microphone to an alignment buffer size.

22. The apparatus of claim 21, wherein the processor is configured to further perform:

inhibiting audio of the at least one speaker after a speaker associated with a third device of the multiple devices is selected to play audio for the audio call.

23. The apparatus of claim 21, wherein the processor is further configured to detect the multiple devices are in proximity to one another based on ultrasound emissions and detections of ultrasound emissions.

24. The apparatus of claim 21, wherein the processor is further configured to detect the multiple devices are in proximity to one another based on a combination of ultrasound emissions and detections with one or more of wireless local area network proximity detection, video detection, or short-range wireless communication detection.

25. The apparatus of claim 21, wherein the processor is further configured to perform:

obtaining a plurality of audio metrics for each of the multiple devices during the audio call, the plurality of audio metrics including at least loudness and a quality metric;

wherein the selecting the first microphone is based on the plurality of audio metrics and switching to the second microphone is based on the plurality of audio metrics.

* * * * *